US008050787B2

United States Patent
Otsuka et al.

(10) Patent No.: US 8,050,787 B2
(45) Date of Patent: Nov. 1, 2011

(54) RECORDING MEDIUM PRODUCTION CONTROL DEVICE, RECORDING MEDIUM PRODUCTION CONTROL METHOD

(75) Inventors: Junichi Otsuka, Nagano-ken (JP);
Yoshitake Sato, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1027 days.

(21) Appl. No.: 11/936,869

(22) Filed: Nov. 8, 2007

(65) Prior Publication Data

US 2008/0123482 A1 May 29, 2008

(30) Foreign Application Priority Data

Nov. 27, 2006 (JP) ................................. 2006-318121

(51) Int. Cl.
*G06F 19/00* (2011.01)
(52) U.S. Cl. ........................................ 700/100; 700/117
(58) Field of Classification Search .................. 700/100, 700/101, 117
See application file for complete search history.

(56) References Cited

U.S. PATENT DOCUMENTS

2007/0280057 A1   12/2007   Ikeda

FOREIGN PATENT DOCUMENTS

| JP | 07-169173 | 7/1995 |
|---|---|---|
| JP | 11-024860 | 1/1999 |
| JP | 11-102583 | 4/1999 |
| JP | 11-184506 | 7/1999 |
| JP | 2002-058649 | 2/2002 |
| JP | 2002-215214 | 7/2002 |
| JP | 2004-323141 | 11/2004 |
| JP | 2006-202379 | 8/2006 |

OTHER PUBLICATIONS

Machine Translation of JP 11-102583 (published 1999).*

* cited by examiner

*Primary Examiner* — Ryan Jarrett
(74) *Attorney, Agent, or Firm* — Mark P. Watson

(57) ABSTRACT

A recording medium production control device, recording medium production control method, and program instructions stored on a tangible computer-readable medium acquire the operating status of the existing data recording device, printer, and other devices in the recording medium production device, plans an operating command sequence for each of the devices to process a request from an application based on the acquired operating status information for the devices, and controls the operation of the devices according to this operating command sequence to produce optical recording media with maximum production efficiency without the devices interfering with each other. The recording medium production control device 10 has a system control unit 40, a data recording unit driver 51, an auto loader driver 53, and a printer driver 60. The system control unit 40 manages the operating sequence of the devices in the recording medium production device 90 to control the devices of the recording medium production device 90 to not interfere with each other.

13 Claims, 6 Drawing Sheets

RECORDING MEDIUM PRODUCTION CONTROL DEVICE, RECORDING MEDIUM PRODUCTION CONTROL METHOD

CROSS-REFERENCE TO RELATED APPLICATIONS

Japanese Patent application No.(s) 2006-318121 is hereby incorporated by reference in its entirety.

BACKGROUND

1. Field of Invention

The present invention relates to a recording medium production control device, to a recording medium production control method, and to a program. More particularly, the invention relates to a recording medium production control device, to a recording medium production control method, and to program instructions stored on a tangible computer-readable medium for controlling a plurality of data recording devices and recording information on optical recording media such as DVDs and CDs.

2. Description of the Related Art

Demand has risen for centrally managing recording data on optical recording media such as CDs and DVDs in order to ensure the confidentiality of personal information and corporate secrets, for example. Demand for producing or dubbing relatively small quantities, such as approximately 10 to 100, optical recording media for distribution at trade shows or on the street is also growing. To meet these needs, disc-publishing devices that record digital data, image data, or music data, for example, at high speed on optical recording media and then print the disc content on the label surface have been introduced. An example of a recording medium production device for business applications is the recording medium production device taught in Japanese Unexamined Patent Appl. Pub. JP-A-2002-58649 that has a disc holder for stocking blank CDs, a CD recording unit, a label printer unit, and a recorded CD holder, and is used for recording medical images on optical recording media and printing an identification label on the label side.

However, manufacturing data recording devices for recording on DVDs, CDs, and other optical recording media at high speed and printers for printing the recording content on the label surface specifically for such recording medium production devices is costly and time-consuming. The development of recording medium production devices that use existing data recording devices and printers to reduce the production cost and production time is thus desired.

However, even if existing devices such as data recording devices and printers are used, these devices are designed to operate separately and independently. A resulting problem is that interference occurs between the transportation unit that carries the optical recording media between the devices and the data recording and printing devices, and the optical recording media production process cannot execute normally. For example, the tray of the data recording device and the transportation unit may collide or the optical recording medium may not be delivered to the printer, and optical recording media production cannot proceed normally.

The printer driver is also set to output to a file in order to send the print commands and print data to the printer after waiting for an optical recording medium to be carried to the printer. A problem with this arrangement is that the printer driver cannot communicate continuously with the printer. The printer driver also cannot get the operating status of the printer.

SUMMARY OF THE INVENTION

A recording medium production control device, a recording medium production control method, and a computer-readable tangible medium having program instructions according to the present invention enable producing optical recording media with maximum efficiency without interference between the component devices of the media production device by obtaining the operating status of the existing components, such as the data recording device and printer, of the recording medium production device, planning the operating procedure of each device in response to requests from an application based on the acquired operating status of the component devices, and controlling the operation of the devices according to the planned procedure.

A recording medium production control device according to a first aspect of the invention controls, through an interface, a recording medium production device that produces optical recording media by recording information based on a request from an application, the recording medium production device having at least one data recording device for writing write data to the optical recording medium, at least one printer for printing print data on the label side of the optical recording medium, and at least one transportation device for transporting the optical recording medium to a preset specific position. The recording medium production control device has a system control unit that controls the operations of the data recording device, the printer, and the transportation device without interference between the operations regardless of the application from which a request is received; and a device control unit that acquires device status information describing the operating status of the data recording device, the printer, and the transportation device.

A recording medium production control device according to a second aspect of the invention also has a write control unit that controls the operation of a plurality of data recording devices separately for each data recording device, a filter control unit that permits the write control unit to control each data recording device and suppresses control of the data recording device by other than a prescribed application, a printing control unit that controls the operation of a plurality of printers separately for each printer, and a transportation control unit that controls the operation of a plurality of transportation devices separately for each transportation device. The system control unit plans an operating command sequence for controlling the operations of the data recording device, the printer, and the transportation device without interference between the operations, and outputs the operating commands to the write control unit, the printing control unit, and the transportation control unit.

In a recording medium production control device according to another aspect of the invention the system control unit plans an operating command sequence for controlling the data recording device, the printer, and the transportation device to operate with maximum optical recording medium production efficiency without interference between the operations based on initial configuration data that sets the devices to be used from among the plurality of data recording devices, printers, and transportation devices, device status information that is acquired through the device control unit, production settings information for producing the optical recording medium requested by the application, and production request data including the production settings information, write data, and print data stored in a temporary storage unit; and outputs the operating commands to the write control unit, the printing control unit, and the transportation control unit based on the planned operating command sequence and the device status information.

These arrangements eliminate the need to provide in the recording medium production device, or the individual devices, functions enabling the data recording devices, the printers, and the transportation devices of the recording medium production device to operate without interfering with each other. Existing devices can therefore be used as each of the devices. The hardware configuration of the recording medium production device can also be very simple. The production cost of the recording medium production device can therefore be reduced, and the development time and manufacturing time can be reduced. Furthermore, because the devices included in the recording medium production device can operate without interfering with each other, the devices will not damage each other. Damage to the optical recording media can also be prevented. Errors in the optical recording media production process can also be reduced. Furthermore, write commands from devices other than the recording medium production control device can be blocked. Write processes executed by requests from the recording medium production control device will therefore not be interrupted by write commands from other devices.

In a recording medium production control device according to another aspect of the invention the system control unit has an initial configuration data acquisition unit that obtains the initial configuration data, a production request data acquisition unit that receives requests from the application and obtains the production request data from the temporary storage unit, a device status information acquisition unit that determines the controlled device from among the plurality of data recording devices, printers, and transportation devices based on the initial configuration data and the production request data, and obtains the device status information for the controlled device from the controlled device through the write control unit, the printing control unit, and the transportation control unit, an operating command sequence planning unit that plans the operating command sequence for controlling operation of the controlled devices based on the acquired device status information and production request data, and an operating command output unit that outputs operating commands to the write control unit, the printing control unit, and the transportation control unit based on the operating command sequence and the device status information.

This arrangement eliminates the need to provide in the recording medium production device, or the individual devices, functions enabling the data recording devices, the printers, and the transportation devices of the recording medium production device to operate without interfering with each other. Existing devices can therefore be used as each of the devices. The hardware configuration of the recording medium production device can also be very simple. The production cost of the recording medium production device can therefore be reduced, and the development time and manufacturing time can be reduced. Furthermore, because the devices included in the recording medium production device can operate without interfering with each other, the devices will not damage each other. Damage to the optical recording media can also be prevented. Errors in the optical recording media production process can also be reduced.

In a recording medium production control device according to another aspect of the invention the write control unit controls the data recording device permitted by the filter control unit, and determines the data recording device to be controlled and sends the write command and the write data to the selected data recording device when a write command is received form the system control unit.

Write processes executed by requests from the recording medium production control device will therefore not be interrupted by write commands from other devices.

In a recording medium production control device according to another aspect of the invention the printing control unit confirms if the print data is stored in the temporary storage unit and notifies the system control unit if the print data is stored when a write and print request or a print request is received from the application, and when a print command is received from the system control unit, determines the printer to control and sends the print command and the print data to the selected printer.

With this arrangement the output setting of the printing control unit can remain set to the USB port, and when a print request is received from an application the print data and the print command can be saved in a file and not output to the output port. Communication with the printer is therefore always possible, and the operating status of the printer (such as the remaining ink level and the print process status) can be acquired. The remaining ink level, for example, can therefore be known before a printing process starts or during the process. Process interruptions due to an error occurring during the printing process can therefore be avoided, and the time consumed by error handling processes can be reduced.

A first aspect of a recording medium production control method according to the invention is a recording medium production control method that controls, through an interface, a recording medium production device that produces optical recording media by recording information based on a request from an application where the recording medium production device has at least one data recording device for writing write data to the optical recording medium, at least one printer for printing print data on the label side of the optical recording medium, and at least one transportation device for transporting the optical recording medium to a preset specific position. The recording medium production control method has steps of: controlling the operations of the data recording device, the printer, and the transportation device without interference between the operations regardless of the application from which a request is received; and acquiring device status information describing the operating status of the data recording device, the printer, and the transportation device.

In a second aspect of a recording medium production control method according to the invention information that sets devices to be used from among a plurality of data recording devices, printers, and transportation devices is initial configuration data, information that describes the operating status of each data recording device, printer, and transportation device is device status information, information for producing the optical recording medium including the type, production quantity, and write format of the optical recording medium requested by the application is production settings information, and information including the production settings information, the write data, and the print data stored in a temporary storage unit is production request data. The recording medium production control method has additional steps of: (a) planning an operating command sequence for controlling each data recording device, each printer, and each transportation device to operate with maximum optical recording medium production efficiency without interference between the operations based on the initial configuration data, the device status information, and the production request data; (b) controlling operation of each transportation device based on the operating command sequence planned in step (a); (c)

controlling operation of each data recording device based on the operating command sequence planned in step (a) and the production request data; (d) permitting control of each data recording device by step (c) and suppressing control of each data recording device by other than the prescribed application; and (e) controlling operation of each printer based on the operating command sequence planned in step (a) and the production request data.

This aspect of the invention affords the same effect as the recording medium production control device according to the invention.

In a recording medium production control method according to another aspect of the invention step (a) in the production control method described above has steps of: (f) receiving a request from the application; (g) acquiring the initial configuration data and the production request data; (h) determining the controlled device from among the plurality of data recording devices, printers, and transportation devices based on the initial configuration data and the production request data acquired in step (g), and obtaining the device status information for the controlled device; and (i) planning an operating command sequence for controlling operation of the devices to be controlled from among the plurality of data recording devices, printers, and transportation devices based on the device status information acquired in step (h).

This aspect of the invention affords the same effect as the recording medium production control device according to the invention.

In a recording medium production control method according to another aspect of the invention step (c) in the production control method described above has steps of: (j) permitting control of each data recording device by an operating command in the operating command sequence planned in step (a) and controlling each data recording device; and (k) determining the data recording device to be controlled and sending the write command and the write data to the selected data recording device when a write command and write data are received from the operating command sequence planned in step (a).

This aspect of the invention affords the same effect as the recording medium production control device according to the invention.

In a recording medium production control method according to another aspect of the invention step (e) in the production control method described above has steps of: (l) determining the printer to be controlled and sending the print command and the print data to the selected printer when a print command and print data are received from the operating command sequence planned in step (a).

This aspect of the invention affords the same effect as the recording medium production control device according to the invention.

In another aspect of the invention, a tangible computer-readable media embodying instructions executable by a computer is provided, the media having instructions that cause a computer to execute a process of controlling, through an interface, a recording medium production device that producing optical recording media according to the methods set forth in the preceding paragraphs.

With this aspect of the invention, when the computer reads the program and executes the process according to the read program, the same effect as the recording medium production control device according to the invention can be achieved.

EFFECT OF THE INVENTION

These arrangements eliminate the need to provide in the recording medium production device, or the individual devices, functions enabling the devices of the recording medium production device to operate without interfering with each other. Existing devices can therefore be used as each of the devices. The hardware configuration of the recording medium production device can also be very simple. The production cost of the recording medium production device can therefore be reduced, and the development time and manufacturing time can be reduced. Furthermore, because the devices included in the recording medium production device can operate without interfering with each other, the devices will not damage each other. Damage to the optical recording media can also be prevented. Errors in the optical recording media production process can also be reduced.

Furthermore, write commands from devices other than the recording medium production control device can be blocked. With this arrangement the output setting of the printing control unit can remain set to the USB port, and when a print request is received from an application the print data and the print command can be saved in a file and not output to the output port. Communication with the printer is therefore always possible, and the operating status of the printer (such as the remaining ink level and the print process status) can be acquired.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of the present invention is described below with reference to the accompanying figures. The embodiment described below is illustrative only, and does not limit the scope of the invention. Therefore, various modifications that replace some or all of the elements described below with equivalent elements will be obvious to one with ordinary skill in the related art, and such embodiments are also included in the scope of the invention.

Figure 1:
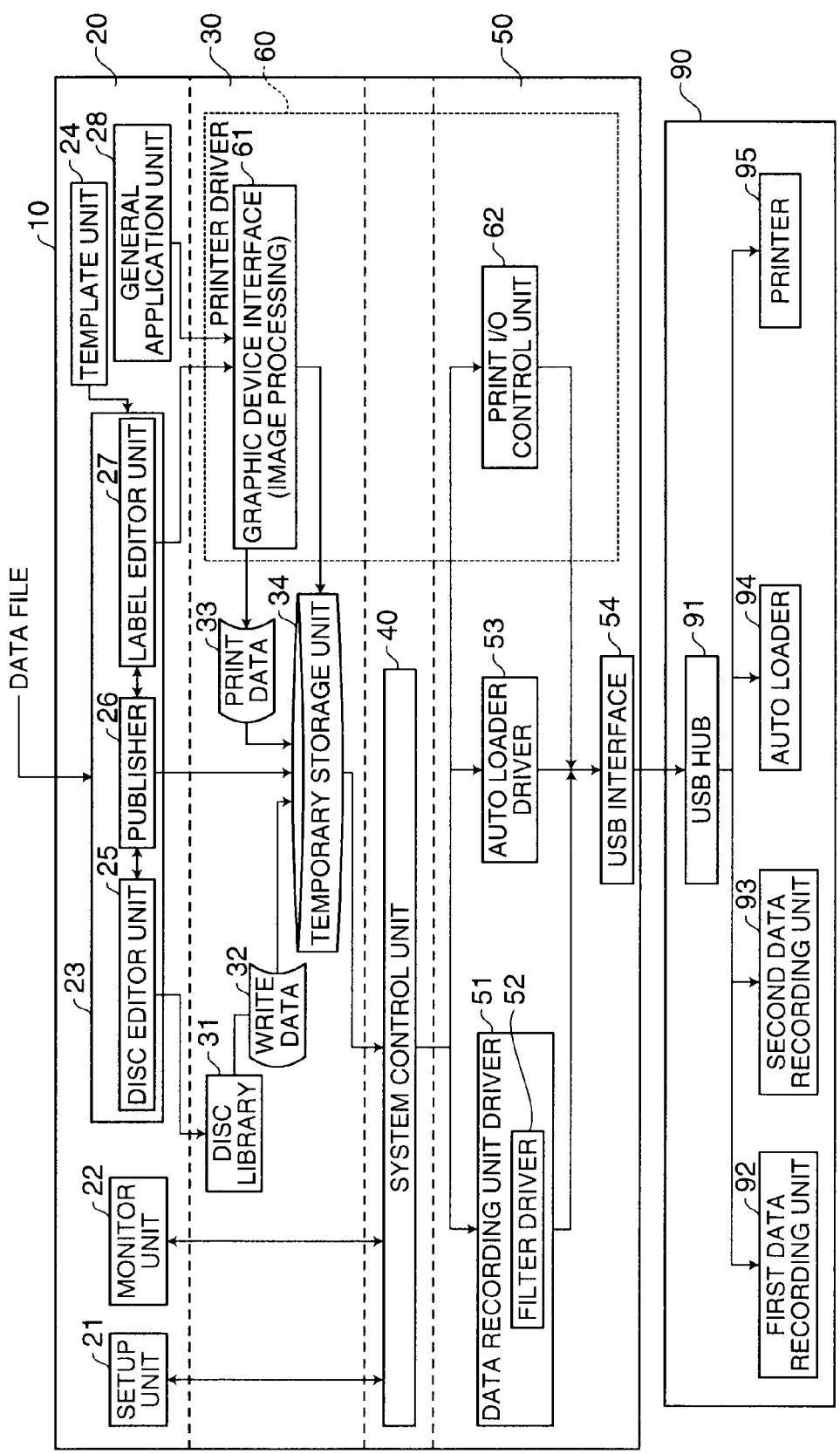
FIG. 1 is a block diagram of a recording medium production control device 10 according to a preferred embodiment of the invention and the recording medium production device 90 that it controls.

FIG. 1 shows a recording medium production control device 10 according to this embodiment of the invention and a recording medium production device 90 that is controlled by the recording medium production control device 10. The recording medium production control device 10 in FIG. 1 can be realized using a personal computer, server, or other host device and software that is installed on the host device. The personal computer or other host device includes hardware such as a CPU, memory such as RAM or ROM, and logic circuits, and software, and can run a general-purpose operating system such as Windows (R).

The recording medium production control device 10 is described as follows, broken down into functional blocks. The recording medium production control device 10 has an application unit 20, a data conversion unit 30, a system control unit 40, and a device control unit 50.

The application unit 20 provides the basic functions for producing optical recording media.

The data conversion unit 30 produces and temporarily stores write data, print data, and production settings information according to data received from the application unit 20.

The system control unit 40 schedules the operating procedure for producing optical recording media based on control signals from the data conversion unit 30, and controls the operating procedure of the drivers in the device control unit 50.

The device control unit 50 includes various drivers and a USB interface 54 for controlling the operation of the recording medium production device 90.

The write data is the information to be written to the optical recording media, the print data is the information to be printed on the label side of the optical recording media, and the production settings information is information including the type of command request (any one of a write and print request, a write request, or a print request), the number of optical recording media to produce, and the format.

The recording medium production device 90 has a USB hub 91 to which are connected a first data recording unit 92, a second data recording unit 93, a auto loader 94 for carrying optical recording media to other stations in the recording medium production device 90, and a printer 95. The recording medium production device 90 can simultaneously write to two optical recording media. While there are two data recording units and one printer provided in the arrangement shown in FIG. 1, more data recording units and printers can be provided to enable parallel processing of more media.

When a write and print request is executed the printer 95 prints after writing data to the first data recording unit 92 or second data recording unit 93 is finished. The first data recording unit 92 or the second data recording unit 93 could have data written to it after the printer 95 finishes printing, but errors in the data writing process are more important and occur more frequently than errors in the printing process, and executing the data writing process first is therefore preferable.

The optical recording media production procedure will be described after briefly describing the functions of the recording medium production control device 10.

The application unit 20 provides a user interface for specifying the data file storing the desired write data and for configuring the print content and format.

In the embodiment shown in FIG. 1 the setup unit 21 provides a function for setting the initial configuration of the recording medium production device 90 (information directed to specific parts of the recording medium production device 90), and the monitor unit 22 provides a function for displaying and confirming the device status information describing the operating status of the various parts of the recording medium production device 90.

The disc production unit 23 has a disc editor unit 25, a publisher 26, and a label editor unit 27, and is used for editing the recording content, editing the production settings, and editing the label. The label can be edited using templates stored in a template unit 24. The general application unit 28 provides functions different from the disc production unit 23, which handles print requests for the label surface.

The content edited by the application unit 20 is output to the data conversion unit 30, and the write data 32 generated by the disc library 31 and the print data 33 generated by the graphic device interface 61 (GDI) of the printer driver 60 (printing control unit) is temporarily stored in the temporary storage unit 34 until the requested job (a job containing any one of a write and print request, a write request, and a print request) based on the type of the request command.

If the print data contains print data that spans plural pages, the print data is segmented. For example, if the print data is composed of data that is printed over plural labels, the print data is segmented into print data for each label, and header information and footer information to be printed before and after each print data segment is added. The header information and the footer information is information related to the paper size and the print orientation, and is contained in the print data. As a result, if the document production application outputs print data for plural labels, the data can be printed sequentially using a printer that prints one label at a time.

The system control unit 40 controls the operating procedure of the different devices in order to execute the job request stored in the temporary storage unit 34. The system control unit 40 plans the operating procedure of the devices 92 to 95 that execute the job requests stored in the temporary storage unit 34, and generates an operating schedule describing the operating procedure. The system control unit 40 controls the operation of the devices 92 to 95 via the device control unit 50 based on the device status information describing the operating status acquired from the devices 92 to 95 through the device control unit 50, and the operating schedule.

More specifically, the system control unit 40 outputs the operating commands of the devices 92 to 95 for the data recording unit driver 51 (write control unit), the auto loader driver 53 (transportation control unit), and the print I/O control unit 62 based on the device status information and the operating schedule. The data recording unit driver 51, the auto loader driver 53, and the print I/O control unit 62 of the printer driver 60 then control the operation of the devices 92 to 95.

This enables controlling the devices 92 to 95 to pick up a blank optical recording medium for each job request, convey, write to, and print on the optical recording medium, and transport the recorded optical recording medium without the devices 92 to 95 interfering with each other. When producing multiple optical recording media, this arrangement also enables efficiently processing the media without the different devices interfering with each other.

The data recording unit driver 51 includes a filter driver 52 (filter control unit) that selects only operating commands from the system control unit 40 as valid commands, and suppresses reception of operating commands for the first data recording unit 92 and the second data recording unit 93 from any source other than the system control unit 40. More specifically, the filter driver 52 allows control of the first data recording unit 92 or the second data recording unit 93 based on requests from a specific application, and suppresses requests from other applications so that those other applications cannot control the first data recording unit 92 or second data recording unit 93.

Figure 2:
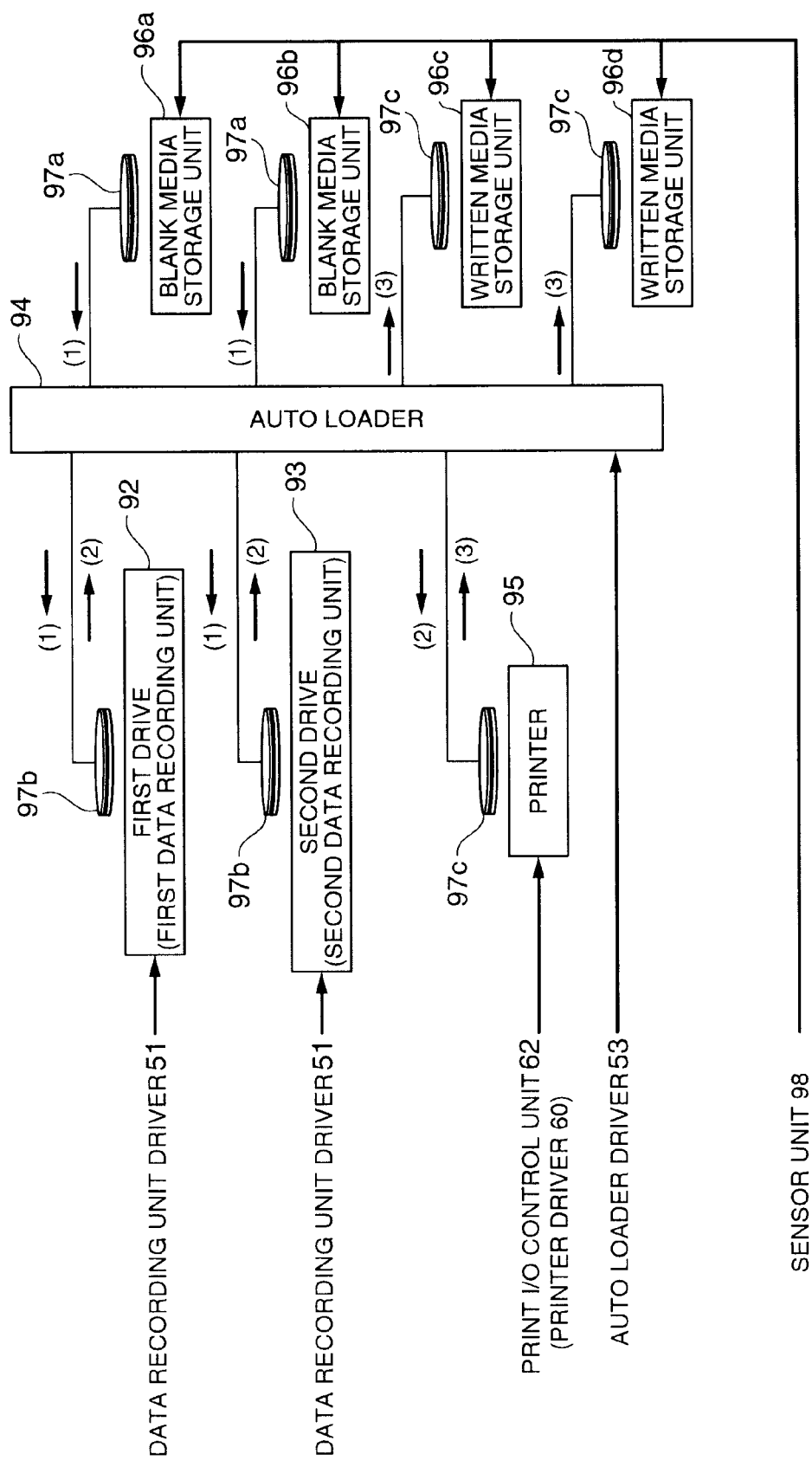
FIG. 2 is a block diagram showing the interactive operation of the parts of the recording medium production device 90.

The optical recording medium processing operation of the recording medium production device 90 is described next with reference to FIG. 2. FIG. 2 is a block diagram describing the operations of the parts of the recording medium production device 90. While not shown in FIG. 1, the recording medium production device 90 has a blank recording media storage unit for storing blank optical recording media (referred to as "blank recording media"), and a written recording media storage unit for storing optical recording media after writing data has finished (referred to as "written recording media"). In the example shown in FIG. 2 there are two blank media storage units 96a and 96b for storing blank recording media 97a, and two written media storage units 96c and 96d for storing written optical recording media 97c.

A job request starts with (1) the auto loader 94 picking up a blank recording medium 97a from the blank media storage unit 96a or blank media storage unit 96b and loading the picked medium in the first data recording unit 92 or second data recording unit 93. The auto loader 94 has a function for picking up optical recording media from the storage unit or printer, and carrying the optical recording media to the specified part in the recording medium production device 90. The storage unit from which the blank recording media are picked up before writing starts can be prioritized, or the storage unit that is closest to the current position of the pickup carrier (not shown in the figure) of the auto loader 94 can be used. A sensor unit 98 is preferably positioned near each of the storage units 96a to 96d to detect when the storage unit 96a to 96d is empty or full.

Whether the first data recording unit 92 or the second data recording unit 93 is used differs according to the current operating conditions. If either data recording unit can be used, which is used is determined according to a pre-assigned order of priority. If the write speed or recording density, or the recording format, of the data recording units differ, the data recording unit that is compatible with the specified writing parameters is used. When a blank recording medium 97a is loaded in the first data recording unit 92 or the second data recording unit 93, the system control unit 40 controls the data recording unit driver 51 to write the content stored in the temporary storage unit 34, resulting in an optical recording medium 97b in which only recording data is completed.

When writing data is completed, (2) the pickup carrier of the auto loader 94 removes and carries the written optical recording medium 97b from the data recording unit 92 or 93 to the printer 95. The printer 95 then prints the label side of the optical recording medium as specified by the job request. When the optical recording medium 97b is loaded into the printer 95, the system control unit 40 controls the print I/O control unit 62 of the printer driver 60 to print the print data stored in the temporary storage unit 34 on the label side of the optical recording medium 97b. More specifically, when a write and print request or a print request is received from the application, the printer driver 60 confirms if print data is stored in the temporary storage unit 34 and reports the presence of print data to the system control unit 40. When the printer driver 60 then receives a print command and print data from the system control unit 40, the printer driver 60 determines which printer to use and sends the print command and print data to the printer. The label side of the optical recording medium 97b is thus printed, and the optical recording medium becomes an optical recording medium 97c in which writing and printing have finished.

The printer driver 60 addresses the printer that is actually connected to the printer port. If the auto loader 94 is operating and the print request from the application cannot be executed immediately, the print command is stored in a temporary command file. When the auto loader 94 finishes transporting the optical recording medium, the print command stored in the temporary command file is output by the printer driver 60. Because the set port is the port to which the printer is actually connected, printer status information (such as the remaining ink level and a progress report) can always be acquired. The operating status of the first data recording unit 92, the second data recording unit 93, and the auto loader 94 can similarly always be acquired.

When printing ends, (3) the written and printed optical recording medium 97c is removed, carried, and stored by the pickup carrier of the auto loader 94 in the written media storage unit 96c or 96d.

An example of a write and print request job that writes data, then prints the label, and then carries and stores the medium in the written media storage unit 96c or 96d is described above. Depending upon the job request, however, the medium could be carried to and stored without printing in the written media storage unit when data recording ends as in a write request job. If the job request is a print request, a blank recording medium 97a could be picked up from the blank media storage unit 96a or 96b or an optical recording medium 97b that has only been written could be picked up, printed, and the optical recording medium that has been printed by the printer 95 could be carried to and stored in the written media storage unit 96c or 96d without writing data.

Figure 3:
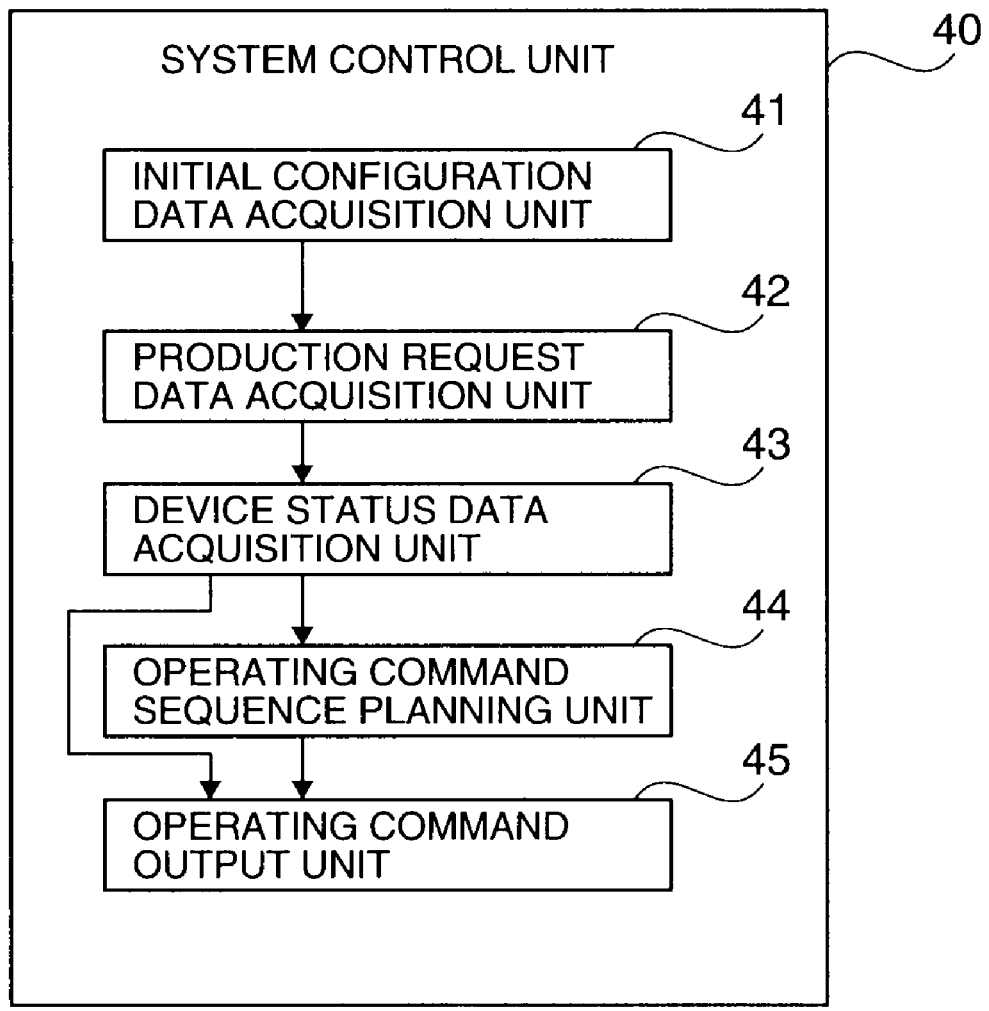
FIG. 3 is a function block diagram showing a preferred embodiment of the system control unit 40.

The system control unit 40 that is a main part of the recording medium production control device 10 according to this embodiment of the invention is described next. FIG. 3 is a function block diagram of the system control unit 40 according to a preferred embodiment of the invention. Only the functions of the parts that are related to the invention are shown in FIG. 3.

An initial configuration data acquisition unit 41 gets the initial configuration information for the mode settings (information configuring the devices 92 to 95 in the recording medium production device 90 that are used) of the recording medium production device 90 that are set by the setup unit 21. The production request data acquisition unit 42 receives job requests from the publisher 26 or graphic device interface 61 through the temporary storage unit 34, and extracts the production settings, the write data, and the print data that are stored in the temporary storage unit 34. These production settings, the write data, and the print data are collectively referred to as the production request data.

The device status data acquisition unit 43 determines which of the devices 92 to 95 are used to execute the process directed by the job request based on the initial configuration data acquired by the initial configuration data acquisition unit 41 and the production request data acquired by the production request data acquisition unit 42. If a write and print request is received, for example, the devices are the first data recording unit 92, the second data recording unit 93, the auto loader 94, and the printer 95. If only a write request is received, the devices are the first data recording unit 92, the second data recording unit 93, and the auto loader 94. If only a print request is received, the devices are the auto loader 94 and the printer 95.

The device status data acquisition unit 43 gets the operating status of the target devices from those devices via the data recording unit driver 51, the auto loader driver 53, and the print I/O control unit 62 of the printer driver 60. The operating status information can be acquired by the device status data acquisition unit 43 regularly polling all of the devices for the operating status information through the data recording unit driver 51, the auto loader driver 53, and the print I/O control unit 62, or by requesting only the particular target devices to send information about the operating status (called "device status information"). Alternatively, all of the devices or only the target devices can be requested to send information about the operating status when the operating status changes.

The operating command sequence planning unit 44 plans the operating command sequence for controlling the first data recording unit 92, the second data recording unit 93, the auto loader 94, and the printer 95 via the data recording unit driver 51, the auto loader driver 53, and the print I/O control unit 62 based on the device status information and the production request data acquired by the device status data acquisition unit 43.

The operating command sequence is planned so that the different devices can operate without interfering with each other. For example, the operating command sequence is planned so that the tray of the first data recording unit 92 and the auto loader 94 do not collide. The operating command sequence is also planned to that the devices operate to process a job request with maximum efficiency. For example, when using the first data recording unit 92 and the second data recording unit 93 to write data, the operating command sequence is planned with consideration for the write speed of the first data recording unit 92 and the second data recording unit 93. If an error occurs while processing a job request and a particular device becomes unusable, a new operating command sequence can also be planned to control the operation of the devices that can be used to continue processing the job request.

The operating command output unit 45 outputs operating commands controlling the operation of the first data recording unit 92, the second data recording unit 93, the auto loader 94, and the printer 95 via the data recording unit driver 51, the auto loader driver 53, and the print I/O control unit 62 based on the device status information and the operating command sequence planned by the operating command sequence planning unit 44. The data recording unit driver 51, the auto loader driver 53, and the print I/O control unit 62 then output control commands controlling the operation of the respective devices based on the operating commands from the operating command output unit 45 to the first data recording unit 92, the second data recording unit 93, the auto loader 94, and the printer 95.

Figure 4:
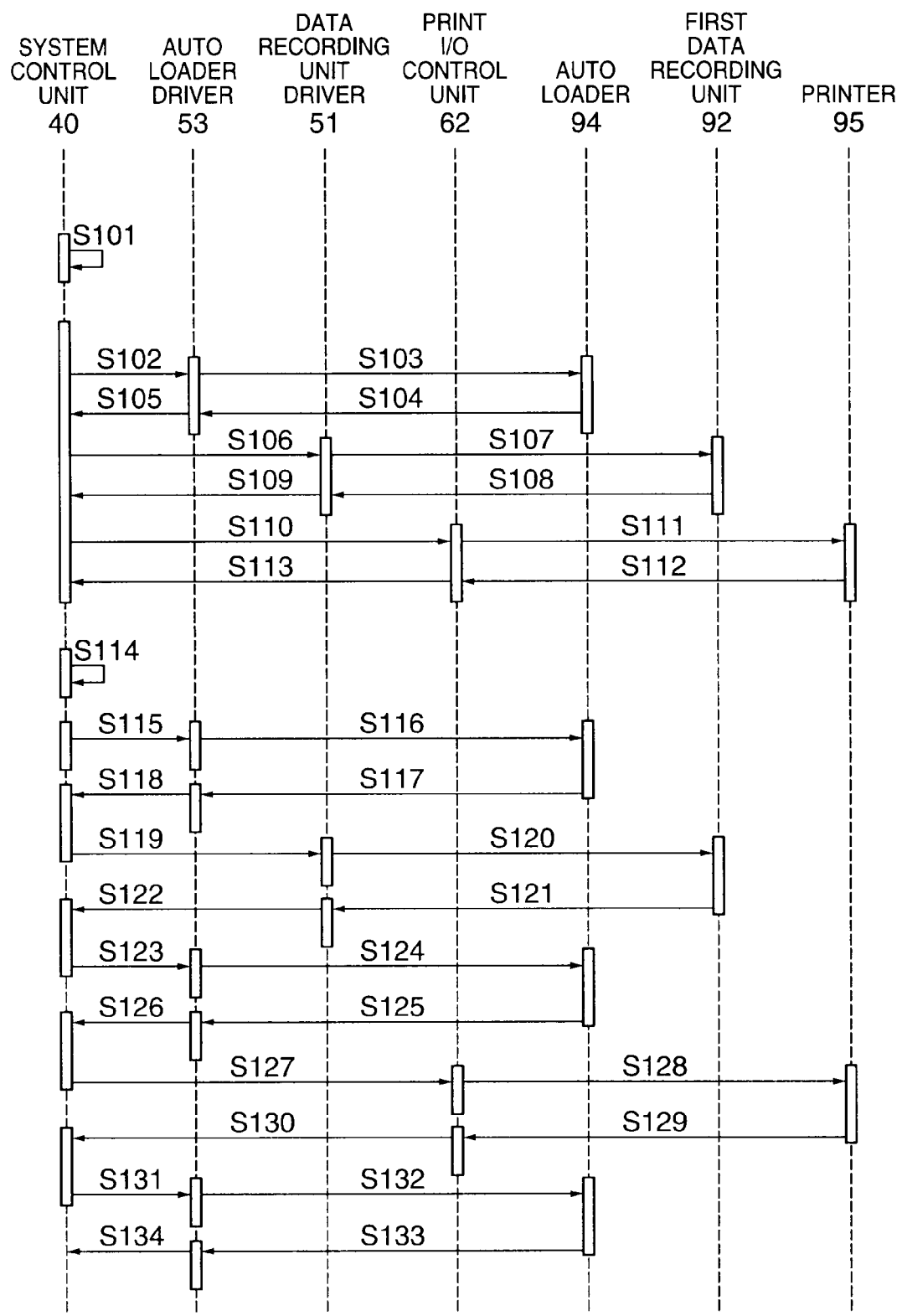
FIG. 4 is a sequence diagram showing the operation of each part when executing a write and print request job.

The operating procedure that is processed by the system control unit 40, the parts of the device control unit 50, and the parts of the recording medium production device 90 based on the job request is described next. FIG. 4 shows an example of the operating sequence of the various parts when executing a write and print request job. In this example data is written using only the first data recording unit 92, the auto loader 94, and the printer 95.

As shown in FIG. 4 when the write and print request job is received from the publisher 26 by way of the temporary storage unit 34, the system control unit 40 gets the initial configuration data and the production request data stored in the temporary storage unit 34 (S101). The system control unit 40 then outputs a command to send an acquisition command to the auto loader driver 53 (S102) to obtain the device status information of the auto loader 94. The auto loader driver 53 then sends the device status information acquisition command to the auto loader 94 (S103). The auto loader 94 sends its operating status information to the auto loader driver 53 (S104), and the auto loader driver 53 outputs the received device status information for the auto loader 94 to the system control unit 40 (S105). The system control unit 40 similarly gets operating status information for the first data recording unit 92 and the printer 95 via the data recording unit driver 51 and the print I/O control unit 62 (S106 to S113).

Next, the system control unit 40 plans the operating command sequence for the first data recording unit 92, the auto loader 94, and the printer 95 based on the acquired operating status information for the first data recording unit 92, the auto loader 94, and the printer 95 (S114).

The system control unit 40 then outputs to the auto loader driver 53 a command to send a transportation command (transportation command 1) to carry a blank recording medium 97a from the blank media storage unit 96a or 96b to the first data recording unit 92 (S115). The auto loader driver 53 sends the transportation command 1 to the auto loader 94 (S116). The auto loader 94 then picks up and carries one blank recording medium 97a from the blank media storage unit 96a or 96b to the first data recording unit 92 and, when the transportation process initiated by transportation command 1 ends, sends operating status information indicating the transportation was completed to the auto loader driver 53 (S117). The auto loader driver 53 then outputs the received operating status information to the system control unit 40 (S118). This completes the process of transporting a blank recording medium 97a from the blank media storage unit 96a or 96b to the first data recording unit 92.

The system control unit 40 then outputs to the data recording unit driver 51 a command to send a command for the first data recording unit 92 to write data to the blank recording medium 97a together with the write data (S119). The data recording unit driver 51 then outputs the data write command and the data to be written to the first data recording unit 92 (S120). The first data recording unit 92 then writes data to the blank recording medium 97a based on the received write data, and when the data writing process ends sends operating status information indicating that writing finished to the data recording unit driver 51 (S121). The data recording unit driver 51 then outputs the received operating status information to the system control unit 40 (S122). This completes writing data to the blank recording medium 97a via the first data recording unit 92, and produces an optical recording medium 97b in which only writing data is completed.

The system control unit 40 then outputs to the auto loader driver 53 a command to send a transportation command (transportation command 2) to carry the optical recording medium 97b from the first data recording unit 92 to the printer 95 (S123). The auto loader driver 53 sends this transportation command 2 to the auto loader 94 (S124). The auto loader 94 then carries the optical recording medium 97b from the first data recording unit 92 to the printer 95 and, when executing this transportation command 2 ends, sends operating status information indicating completion of the operation to the auto loader driver 53 (S125). The auto loader driver 53 then outputs the received operating status information to the system control unit 40 (S126). This completes the process of transporting the optical recording medium 97b from the first data recording unit 92 to the printer 95.

The system control unit 40 then outputs a command to send a command for printing the label side of the optical recording medium 97b via the printer 95 to the print I/O control unit 62 together with the print data (S127). The print I/O control unit 62 then sends the print command and the print data to the printer 95 (S128). The printer 95 then prints on the label side of the optical recording medium 97b based on the print data and, when printing data according to the print command ends, sends operating status information indicating that printing ended to the print I/O control unit 62 (S129). The print I/O control unit 62 then outputs the received operating status information to the system control unit 40 (S130). The process of the printer 95 printing the label side of the optical recording medium 97b thus ends and a finished, written optical recording medium 97c is produced.

The system control unit 40 then outputs to the auto loader driver 53 a command to send a transportation command (transportation command 3) to carry the medium from the printer 95 to the written media storage unit 96c or 96d (S131).

The auto loader driver 53 then sends this transportation command 3 to the auto loader 94 (S132). The auto loader 94 then removes and carries the written optical recording medium 97c from the printer 95 to the written media storage unit 96c or 96d and, when executing this transportation command 3 ends, sends operating status information indicating completion of the operation to the auto loader driver 53 (S133). The auto loader driver 53 then outputs the received operating status information to the system control unit 40 (S134). This completes the process of transporting the written optical recording medium 97c from the printer 95 to the written media storage unit 96c or 96d.

This completes the write and print request job that produces one written optical recording medium 97c. If there are plural optical recording media to produce, steps S115 to S134 above repeat until the specified number of optical recording media are produced and the write and print request job ends.

Figure 5:
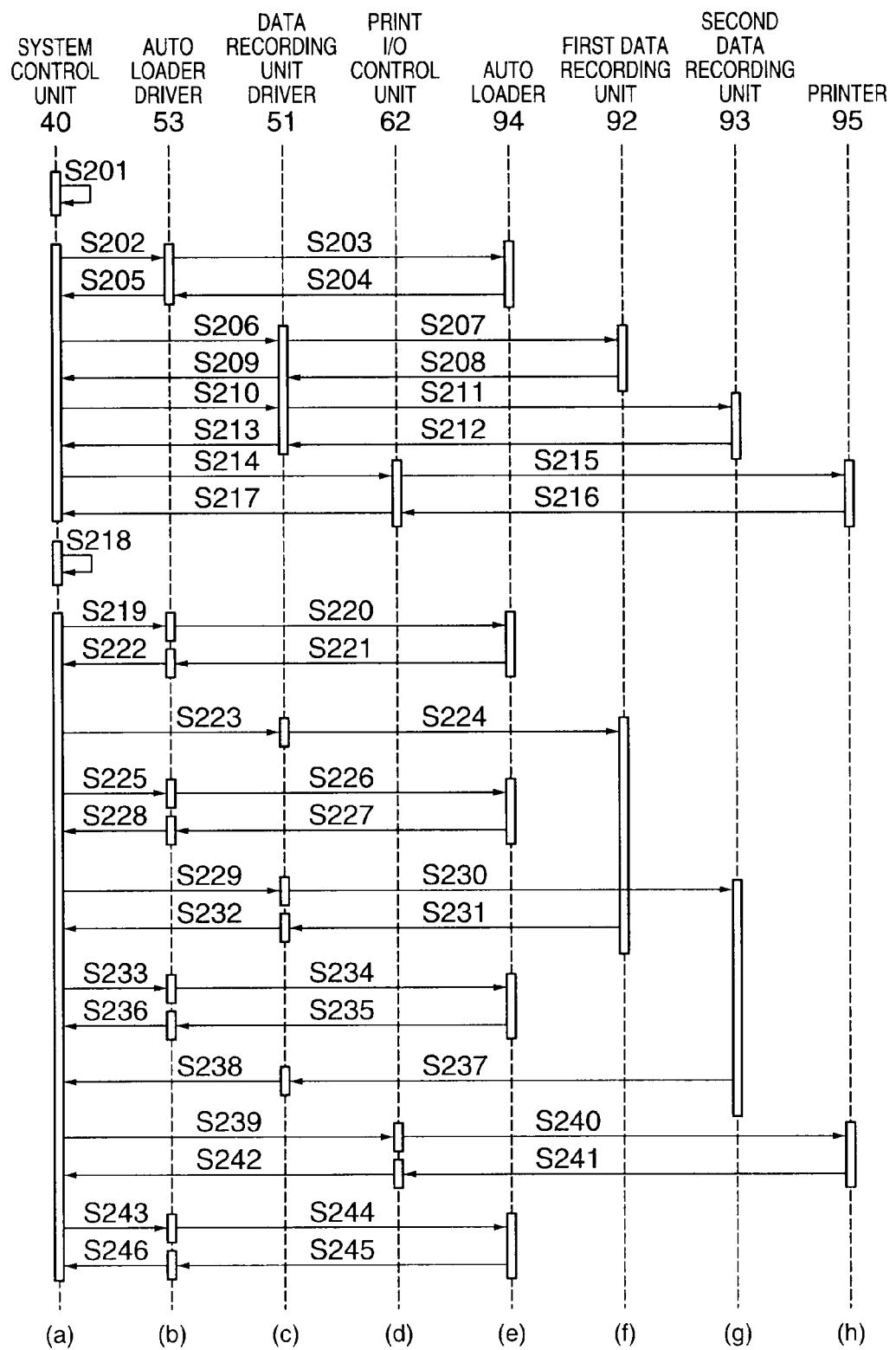
FIG. 5 is a sequence diagram showing the operation of each part when executing a write and print request job using a plurality of data recording units.
Figure 6:
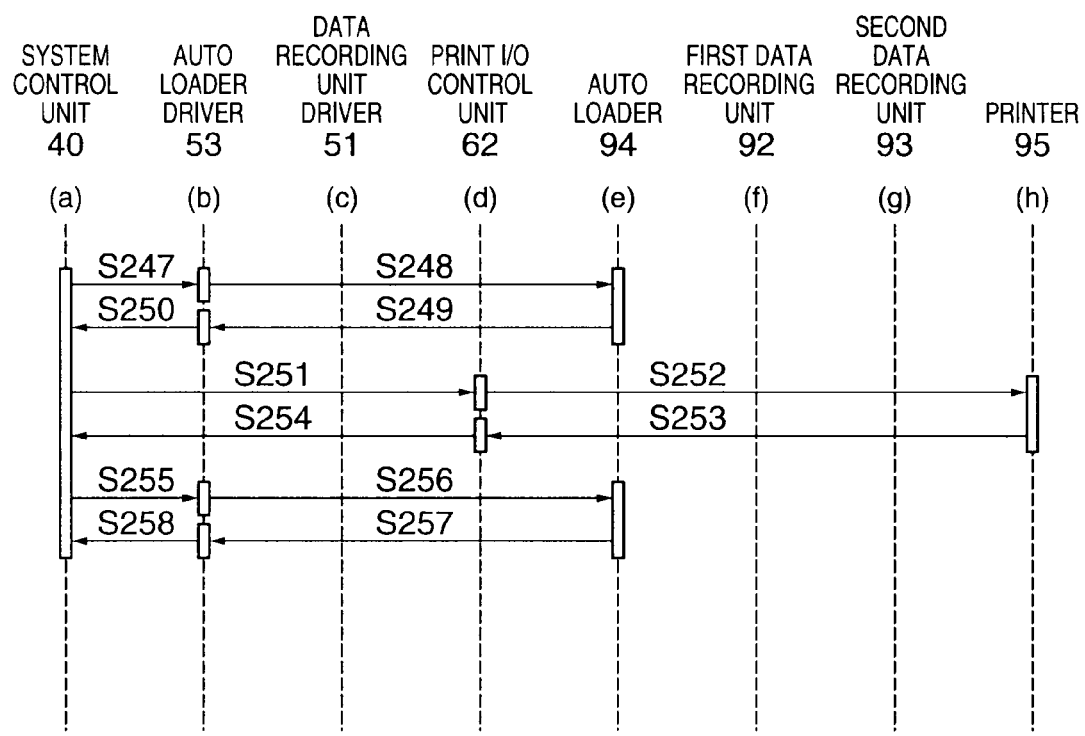
FIG. 6 is a continuation of the sequence diagram shown in FIG. 5.

FIG. 5 and FIG. 6 are a sequence diagram describing the processes executed by each of the parts when executing a write and print request job that uses plural data recording units.

When the write and print request job is received from the publisher 26 by way of the temporary storage unit 34, the system control unit 40 gets the initial configuration data and the production request data stored in the temporary storage unit 34 (S201). The system control unit 40 then outputs a command to send an acquisition command to get the device status information of the auto loader 94 to the auto loader driver 53 (S202). The auto loader driver 53 sends the device status information acquisition command to the auto loader 94 (S203). The auto loader 94 sends its operating status information to the auto loader driver 53 (S204), and the auto loader driver 53 outputs the received device status information for the auto loader 94 to the system control unit 40 (S205). The system control unit 40 similarly gets operating status information for the first data recording unit 92, the second data recording unit 93, and the printer 95 via the data recording unit driver 51 and the print I/O control unit 62 (S206 to S217).

Next, the system control unit 40 plans the operating command sequence for the first data recording unit 92, the second data recording unit 93, the auto loader 94, and the printer 95 based on the acquired operating status information for the first data recording unit 92, the second data recording unit 93, the auto loader 94, and the printer 95 (S218).

The system control unit 40 then outputs to the auto loader driver 53 a command to send a transportation command (transportation command 1) to carry a blank recording medium 97a from the blank media storage unit 96a or 96b to the first data recording unit 92 (S219). The auto loader driver 53 sends the transportation command 1 to the auto loader 94 (S220). The auto loader 94 then picks up and carries one blank recording medium 97a from the blank media storage unit 96a or 96b to the first data recording unit 92 and, when the transportation process initiated by transportation command 1 ends, sends operating status information indicating the transportation was completed to the auto loader driver 53 (S221). The auto loader driver 53 then outputs the received operating status information to the system control unit 40 (S222). This completes the process of transporting a blank recording medium 97a from the blank media storage unit 96a or 96b to the first data recording unit 92.

The system control unit 40 then outputs to the data recording unit driver 51 a command to send a command for the first data recording unit 92 to write data to the blank recording medium 97a together with the write data (S223). The data recording unit driver 51 then outputs the data write command and the data to be written to the first data recording unit 92 (S224). The first data recording unit 92 then writes data to the blank recording medium 97a based on the received write data.

The system control unit 40 then outputs to the auto loader driver 53 a command to send a transportation command (transportation command 2) to carry a blank recording medium 97a from the blank media storage unit 96a or 96b to the second data recording unit 93 (S225). The auto loader driver 53 sends the transportation command 2 to the auto loader 94 (S226). The auto loader 94 then picks up and carries one blank recording medium 97a from the blank media storage unit 96a or 96b to the second data recording unit 93 and, when the transportation process initiated by transportation command 2 ends, sends operating status information indicating the transportation was completed to the auto loader driver 53 (S227). The auto loader driver 53 then outputs the received operating status information to the system control unit 40 (S228).

The system control unit 40 then outputs to the data recording unit driver 51 a command to send a command for the second data recording unit 93 to write data to the blank recording medium 97a together with the write data (S229). The data recording unit driver 51 then outputs the data write command and the data to be written to the second data recording unit 93 (S230). The second data recording unit 93 then writes data to the blank recording medium 97a based on the received write data.

When the first data recording unit 92 completes the data writing process initiated by the data write command, it sends operating status information indicating that writing finished to the data recording unit driver 51 (S231). The data recording unit driver 51 then outputs the received operating status information to the system control unit 40 (S232). This completes writing data to the blank recording medium 97a via the first data recording unit 92, and produces an optical recording medium 97b in which only writing data is completed.

The system control unit 40 then outputs to the auto loader driver 53 a command to send a transportation command (transportation command 3) to carry the optical recording medium 97b from the first data recording unit 92 to the printer 95 (S233). The auto loader driver 53 sends this transportation command 3 to the auto loader 94 (S234). The auto loader 94 then carries the optical recording medium 97b from the first data recording unit 92 to the printer 95 and, when executing this transportation command 3 ends, sends operating status information indicating completion of the operation to the auto loader driver 53 (S235). The auto loader driver 53 then outputs the received operating status information to the system control unit 40 (S236). This completes the process of transporting the optical recording medium 97b from the first data recording unit 92 to the printer 95. While not shown in the figure, when there are write requests and when there are write and print requests to produce three or more optical recording media, the system control unit 40 could output the commands for sending a transportation command to carry the blank recording medium 97a from the blank media storage unit 96a or 96b to the first data recording unit 92 to the auto loader 94.

When the second data recording unit 93 completes the data writing process initiated by the data write command, it sends operating status information indicating that writing finished to the data recording unit driver 51 (S237). The data recording unit driver 51 then outputs the received operating status information to the system control unit 40 (S238). This completes writing data to the blank recording medium 97a via the second data recording unit 93, and produces an optical recording medium 97b in which only writing data is completed. The optical recording medium waits in the second data recording unit 93 until transportation to the printer 95 is possible.

The system control unit 40 then outputs a command to send a command for printing the label side of the optical recording medium 97b via the printer 95 to the print I/O control unit 62 together with the print data (S239). The print I/O control unit 62 then sends the print command and the print data to the printer 95 (S240). The printer 95 then prints on the label side of the optical recording medium 97b based on the print data and, when printing data according to the print command ends, sends operating status information indicating that printing ended to the print I/O control unit 62 (S241). The print I/O control unit 62 then outputs the received operating status information to the system control unit 40 (S242). The process of the printer 95 printing the label side of the optical recording medium 97b thus ends and a finished, written optical recording medium 97c is produced.

The system control unit 40 then outputs to the auto loader driver 53 a command to send a transportation command (transportation command 4) to carry the medium from the printer 95 to the written media storage unit 96c or 96d (S243). The auto loader driver 53 then sends this transportation command 4 to the auto loader 94 (S244). The auto loader 94 then removes and carries the written optical recording medium 97c from the printer 95 to the written media storage unit 96c or 96d and, when executing this transportation command 4 ends, sends operating status information indicating completion of the operation to the auto loader driver 53 (S245). The auto loader driver 53 then outputs the received operating status information to the system control unit 40 (S246). This completes the process of transporting the written optical recording medium 97c from the printer 95 to the written media storage unit 96c or 96d.

Referring now to FIG. 6, the system control unit 40 then outputs to the auto loader driver 53 a command to send a transportation command (transportation command 5) to carry the optical recording medium 97b from the second data recording unit 93 to the printer 95 (S247). The auto loader driver 53 sends this transportation command 5 to the auto loader 94 (S248). The auto loader 94 then carries the optical recording medium 97b from the second data recording unit 93 to the printer 95 and, when executing this transportation command 5 ends, sends operating status information indicating completion of the operation to the auto loader driver 53 (S249). The auto loader driver 53 then outputs the received operating status information to the system control unit 40 (S250). This completes the process of transporting the optical recording medium 97b from the second data recording unit 93 to the printer 95.

The system control unit 40 then outputs a command to send a command for printing the label side of the optical recording medium 97b via the printer 95 to the print I/O control unit 62 together with the print data (S251). The print I/O control unit 62 then sends the print command and the print data to the printer 95 (S252). The printer 95 then prints on the label side of the optical recording medium 97b based on the print data and, when printing data according to the print command ends, sends operating status information indicating that printing ended to the print I/O control unit 62 (S253). The print I/O control unit 62 then outputs the received operating status information to the system control unit 40 (S254). The process of the printer 95 printing the label side of the optical recording medium 97b thus ends and a finished, written optical recording medium 97c is produced.

If there are plural optical recording media to produce, conveying the blank recording media 97a to the first data recording unit 92 (S219 to S222), conveying blank recording media 97a to the second data recording unit 93 (S225 to S228), writing via the first data recording unit 92 and the second data recording unit 93 (S223 to S224, S231 to S232 and S229 to S230, S237 to S238), carrying the media from the first data recording unit 92 and the second data recording unit 93 to the printer 95 (S233 to S236 and S247 to S250), and removing the written optical recording medium 97c from the printer 95 (S243 to S246 and S255 to S258) are appropriately scheduled to repeat until the specified number of optical recording media are produced and the write and print request job ends.

The invention can be implemented in digital electronic circuitry, or in computer hardware, firmware, software, or in combinations of them. The invention can be implemented in a computer program product tangibly embodied in a machine-readable or computer readable storage device for execution by a programmable processor or computer. Computer readable storage devices may include, for example, diskettes, compact disks (CDs), DVDs, solid-state memory devices, and the like.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A recording medium production control device that controls, through an interface, a recording medium production device that produces optical recording media by recording information based on a request from an application, wherein:

the recording medium production device has at least one data recording device for writing write data to the optical recording medium, at least one printer for printing print data on a label side of the optical recording medium, and at least one transportation device for transporting the optical recording medium to a preset specific position; and the recording medium production control device comprises:

a system control unit that controls the operations of the data recording device, the printer, and the transportation device without interference between the operations regardless of the application from which a request is received;

a device control unit that acquires device status information describing the operating status of the data recording device, the printer, and the transportation device;

a write control unit that controls the operation of at least one of a plurality of data recording devices separately for each of the plurality of data recording devices:

a filter control unit that permits the write control unit to control the at least one data recording device and suppresses control of the at least one data recording device by other than a prescribed application;

a printing control unit that controls the operation of at least one of a plurality of printers separately for each of the plurality of printers; and a transportation control unit that controls the operation of at least one of a plurality of transportation devices separately for each of the plurality of transportation devices;

wherein the system control unit plans an operating command sequence for controlling the operations of the at least one data recording device, the at least one printer, and the at least one transportation device without interference between the operations, and outputs the operating commands to the write control unit, the printing control unit, and the transportation control unit.

2. The recording medium production control device described in claim 1, wherein:
the system control unit plans an operating command sequence for controlling the at least one data recording device, printer, and transportation device to operate with maximum optical recording medium production efficiency without interference between the operations based on:
initial configuration data that sets the at least one data recording device, printer, and transportation device to be used from among the plurality of data recording devices, printers, and transportation devices,
device status information that is acquired through the device control unit,
production settings information for producing the optical recording medium requested by the application, and
production request data including the production settings information, write data, and print data stored in a temporary storage unit; and
outputs the operating commands to the write control unit, the printing control unit, and the transportation control unit based on the planned operating command sequence and the device status information.

3. The recording medium production control device described in claim 2, wherein the system control unit comprises:
an initial configuration data acquisition unit that obtains the initial configuration data;
a production request data acquisition unit that receives requests from the application and obtains the production request data from the temporary storage unit;
a device status information acquisition unit that determines the at least one data recording device, printer, and transportation device from among the plurality of data recording devices, printers, and transportation devices based on the initial configuration data and the production request data, and obtains the device status information for the at least one data recording device, printer, and transportation device from the at least one data recording device, printer, and transportation device through the write control unit, the printing control unit, and the transportation control unit;
an operating command sequence planning unit that plans the operating command sequence for controlling operation of the at least one data recording device, printer, and transportation device based on the acquired device status information and production request data; and
an operating command output unit that outputs operating commands to the write control unit, the printing control unit, and the transportation control unit based on the operating command sequence and the device status information.

4. The recording medium production control device described in claim 2, wherein the printing control unit confirms if the print data is stored in the temporary storage unit and notifies the system control unit if the print data is stored when a write and print request or a print request is received from the application, and
when a print command is received from the system control unit, determines the at least one printer to control and sends the print command and the print data to the determined at least one printer.

5. The recording medium production control device described in claim 1, wherein the write control unit controls the at least one data recording device permitted by the filter control unit, and
determines the at least one data recording device to be controlled and sends the write command and the write data to the determined at least one data recording device when a write command is received form the system control unit.

6. A recording medium production control method that controls, through an interface, a recording medium production device that produces optical recording media by recording information based on a request from an application, wherein:
the recording medium production device has at least one data recording device for writing write data to the optical recording medium, at least one printer for printing print data on a label side of the optical recording medium, and at least one transportation device for transporting the optical recording medium to a preset specific position; and
the recording medium production control method comprises steps of:
controlling the operations of the at least one data recording device, printer, and transportation device without interference between the operations regardless of the application from which a request is received; and
acquiring device status information describing the operating status of the at least one data recording device, printer, and transportation device; and wherein
information that sets the at least one data recording device, printer, and transportation device to be used from among a plurality of data recording devices, printers, and transportation devices is initial configuration data,
information that describes the operating status of the at least data recording device, printer, and transportation device is device status information,
information for producing the optical recording medium including the type, production quantity, and write format of the optical recording medium requested by the application is production settings information, and
information including the production settings information, the write data, and the print data stored in a temporary storage unit is production request data, and
the recording medium production control method further comprises steps of:
(a) planning an operating command sequence for controlling the at least one data recording device, printer, and transportation device to operate with maximum optical recording medium production efficiency without interference between the operations based on the initial configuration data, the device status information, and the production request data;
(b) controlling operation of the at least one transportation device based on the operating command sequence planned in step (a)
(c) controlling operation of the at least one data recording device based on the operating command sequence planned in step (a) and the production request data:
(d) permitting control of the at least one data recording device by step (c) and suppressing control of the data recording device by other than the prescribed application; and
(e) controlling operation of the at least one printer based on the operating command sequence planned in step (a) and the production request data.

7. The recording medium production control method described in claim 6, wherein step (a) comprises steps of:
(f) receiving a request from the application;
(g) acquiring the initial configuration data and the production request data;

(h) determining the at least one data recording device, printer, and transportation device to be used from among the plurality of data recording devices, printers, and transportation devices based on the initial configuration data and the production request data acquired in step (g), and getting the at least one data recording device, printer, and transportation device status information for the at least one data recording device, printer, and transportation device; and (i) planning an operating command sequence for controlling operation of the at least one data recording device, printer, and transportation device from among the plurality of data recording devices, printers, and transportation devices based on the device status information acquired in step (h).

8. The recording medium production control method described in claim 6, wherein step (c) comprises steps of:

(j) permitting control of the at least one data recording device by an operating command in the operating command sequence planned in step (a) and controlling the at least one data recording device; and (k) determining the at least one data recording device to be controlled and sending the write command and the write data to the determined at least one data recording device when a write command and write data are received from the operating command sequence planned in step (a).

9. The recording medium production control method described in claim 6, wherein step (e) comprises a step of:

(l) determining the at least one printer to be controlled and sending the print command and the print data to the determined at least one printer when a print command and print data are received from the operating command sequence planned in step (a).

10. A tangible computer-readable medium embodying program instructions executable by a computer, the media including instructions for performing the recording medium production control method of claim 6.

11. A tangible computer-readable medium embodying program instructions executable by a computer, the media including instructions for performing the recording medium production control method of claim 7.

12. A tangible computer-readable medium embodying program instructions executable by a computer, the media including instructions for performing the recording medium production control method of claim 8.

13. A tangible computer-readable medium embodying program instructions executable by a computer, the media including instructions for performing the recording medium production control method of claim 9.

* * * * *